United States Patent [19]

Tinus

[11] Patent Number: 5,095,414

[45] Date of Patent: Mar. 10, 1992

[54] GREENHOUSE ILLUMINATION SYSTEM

[75] Inventor: Richard W. Tinus, Flagstaff, Ariz.

[73] Assignee: The United States of America as represented by the Secretary of Agriculture, Washington, D.C.

[21] Appl. No.: 712,226

[22] Filed: Jun. 7, 1991

[51] Int. Cl.⁵ .............................................. F21V 17/02
[52] U.S. Cl. ................................... 362/284; 362/324; 362/276; 362/805; 47/DIG. 6
[58] Field of Search ................... 47/DIG. 6; 362/276, 362/277, 282, 284, 322, 324, 805, 35

[56] References Cited

U.S. PATENT DOCUMENTS

| | | | |
|---|---|---|---|
| 1,991,101 | 2/1935 | Kennelly | 362/332 |
| 2,464,318 | 3/1949 | Kennelly | 362/282 X |
| 2,954,771 | 10/1960 | Boyan | 362/272 X |
| 3,062,987 | 11/1962 | Cuffman | 362/428 X |
| 4,441,145 | 4/1984 | Antkowiak | 362/805 X |
| 4,600,973 | 7/1986 | Mori | 362/805 X |
| 4,626,065 | 12/1986 | Mori | 362/805 X |
| 4,734,830 | 3/1988 | Cristian et al. | 362/805 X |
| 4,797,796 | 1/1989 | Eastman, II et al. | 362/428 X |
| 4,827,388 | 5/1989 | Miyazawa | 362/282 X |
| 4,920,468 | 4/1990 | Narita | 362/427 X |
| 4,935,855 | 6/1990 | Narita | 362/428 X |

FOREIGN PATENT DOCUMENTS

| | | | |
|---|---|---|---|
| 8300035 | 8/1984 | Netherlands | 47/DIG. 6 |
| 8800483 | 9/1989 | Netherlands | 47/DIG. 6 |
| 1018592 | 5/1983 | U.S.S.R. | 47/DIG. 6 |
| 2140262 | 11/1984 | United Kingdom | 47/DIG. 6 |

OTHER PUBLICATIONS

Science News Letter, Sep. 3, 1955, p. 151, Horticulture, "Rotate Light Bulbs for Winter Plant Growth".
"How to Grow Tree Seedlings in Containers in Greenhouses," RM-60, May, 1979, by R. W. Tinus and S. E. McDonald, pp. 43–45, See p. 45, USDA Forest Service.

Primary Examiner—Stephen F. Husar
Attorney, Agent, or Firm—M. Howard Silverstein; John D. Fado; Janet I. Stockhausen

[57] ABSTRACT

An improved single light fixture for use in intermittently illuminating plants in a greenhouse. A bulb of a particular selected light output frequency is selected, and the fixture comprises an oscillating parabolic mirror which sweeps the light from the bulb across all of the plants in the greenhouse.

17 Claims, 5 Drawing Sheets

GREENHOUSE ILLUMINATION SYSTEM

FIELD OF THE INVENTION

This invention relates to improved methods and apparatus for use in greenhouse nursery techniques. It relates to improvements in forestry, as in the raising of seedlings, and to horticulture, as in the raising of floral and all sorts of other plants. The invention provides means to effectively "shorten the night" to control growth of the young plants, in particular, to prevent premature growth stoppage and dormancy of the plants.

BACKGROUND OF THE INVENTION

Dormancy in perennial plants is controlled by phytochrome, a protein hormone. In its active form, produced by red light (660nm), bud dormancy is prevented and height growth continues. Phytochrome slowly degrades to an inactive form in the dark. In the absence of sufficient active phytochrome, buds are set and height growth ceases.

In order to insure that seedlings reach a desired commercial size on schedule, it is often important to provide supplemental light at night to prevent premature dormancy. The intensity need not be great; 40 foot candles is enough. Furthermore, since red light inhibits stem elongation, it is best if the light is intermittent. As little as 1 part in 30 is enough as long as no dark period is longer than 30 minutes.

Since only red light is important and other wavelengths are much less efficient or even detrimental (far red (730 nm) reverses the effect of red light), light sources vary tremendously in their efficiency. Tungsten incandescent bulbs are the least efficient but can be turned on and off rapidly and repeatedly without loss of bulb life. They are commonly used in greenhouses as a fixed over-head array in spite of the large number of fixtures required and the day time shading of natural sunlight they impose on the plants.

Fluorescent lights are much more efficient light sources, but cannot be turned on and off repeatedly without greatly shortening bulb life. Fixed arrays of fluorescent lights are more expensive than incandescent, and their bulk creates more shade. They are practical only if mounted on a moving boom, such as many greenhouses have for watering. The lights remain on most of the night and the boom moves back and forth from one end of the greenhouse to the other which creates the intermittent light. However, there are two major disadvantages: (1) providing electric power to a moving water boom requires a complex mechanical system with a correspondingly large potential for safety and reliability problems; and (2) because it operates at night, it is usually unattended. If it fails, the problem may not be discovered until the next day.

The most efficient light source is the high pressure sodium arc light. Its spectrum is concentrated very close to the most effective wavelengths for dormancy prevention and it has little or no far red. However, the fixtures are very expensive, and it is impossible to turn the lights on and off rapidly. Furthermore, the light is very intense, more so than needed, so much of their output is frequently wasted. However, only one such light would serve if it were centrally mounted overhead, and if its light could be spread evenly over the plants in the greenhouse.

SUMMARY AND ADVANTAGES OF THE INVENTION

A great deal of work has been done in this field and in related fields in regard to control of light. As to greenhouse applications, the present invention has an important advantage in that it uses the ideal light source. While there are certain problems in using the preferred lamps, the present invention has overcome those problems, permitting its use in a highly efficient manner.

An advantage is the minimization of electricity required. This is due to the fact that, for most sizes of commercial greenhouses, only a single lamp of relatively modest wattage is required.

Yet another advantage is that the life of the lamp is prolonged because it is on constantly when in use, rather than being turned on and off as is the case with other lighting systems.

Yet another advantage is that the apparatus of the invention is extremely simple and light weight, and thus is correspondingly inexpensive and easy to mount and maintain.

A corresponding advantage as to maintenance is that the bulb is kept stationary, thus assuring and simplifying its reliable use in the rigorous environment inside a greenhouse, i.e., the high heat and humidity to which everything inside a greenhouse is subjected. The lamp ballast, as well as all of the electrical controls, can be easily located outside the greenhouse where they can be handled in an ordinary manner, and need not be protected from the high humidity, dripping water, and the like inside the greenhouse.

Many prior art arrays of lights are heavy, expensive, prone to failure, and the like. All of these disadvantages are overcome by the present invention by its simple apparatus.

The invention provides a single lamp of the character described, which is stationary and located centrally in the greenhouse. The apparatus includes an oscillating parabolic mirror located around the lamp with the lamp at the focal line of the mirror. The swing of the mirror is controlled in accordance with the shape of the greenhouse and the location of the lamp therein. The result is to cause the light to sweep back and forth at a predetermined rate from one end of the greenhouse to the other. The manner of operation is somewhat analogous to a lighthouse as is used in shipping and navigation.

An important inherent advantage of the invention is that uniform lighting of all of the plants in the greenhouse is achieved automatically. The dwell time for lighting a given area will be longest at the ends of the greenhouse and shortest directly beneath the lamp. Thus, the invention is self-compensating, because the light intensity is the weakest at the ends of the swing and the strongest directly under the lamp. So, an automatic balance of the light provided is achieved between light intensity and dwell time as to the plants being treated.

The invention includes very simple controls which may comprise a time clock or a photocell. The time clock would turn on the lamp and oscillation system at dusk and then off at dawn. A photocell could be used to perform the same functions, but would not need resetting as the seasons change.

Some important features of the invention include making the mirror of stainless steel. Other materials were tried and failed, in particular, plastics tend to melt because of the great heat intensity produced by the lamp. The structure is built in such a way that the mounting bracket is provided at the natural center of gravity of the entire apparatus. Finally, the apparatus is structured in such a way that the lamp does not move, but rather the mirror oscillates around it. This has been found to be an important advantage in a greenhouse because of the rigorous conditions of water, humidity and heat present therein. The slightest imperfection in insulation of the wires to the lamp will result in corrosion and premature failure. By keeping the lamp stationary, the chance of stress cracks and the like, which would otherwise almost surely be induced in the parts subjected to such motion of the lamp, are totally avoided. Thus, this seemingly simple feature of keeping the lamp and all electrical portions stationary and moving the mirror with a mechanical linkage is in fact very important, and not at all simple or obvious because of the particular demands of the greenhouse environment in which the invention is used.

The assembly of parts is arranged to oscillate the mirror up to 180 degrees. This permits use of the invention in greenhouses of various sizes. A simple adjustment in the oscillating linkage permits this advantage.

The invention is to be clearly distinguished from all prior art systems which involve moving booms, rotating lights, and the like. All of such systems have the severe disadvantages, discussed above, of high maintenance, and difficulty in preventing deterioration of the electrical portions of such systems. The invention's provision of a non-moving electrical portion is an important advantage in this regard over all such prior art systems.

Yet another advantage of the invention is that the small compact apparatus, and only one such apparatus in total being provided, provides the absolute minimum of day time shading on the growing plants. In the prior art, large arrays of incandescent lights and the light are provided, and these provide a substantial amount of daytime shading of natural light.

Another advantage to the present system is the ease with which the light bulb can be changed because only one long-lasting light bulb is used, rather than a bank of light bulbs which frequently burn out, and therefore require frequent removal and replacement. The present system decreases the periodic maintenance required to keep the illumination system operational.

As to the plant biology, in addition to the automatic achieving of balanced light from the far ends to the central part of the greenhouse as discussed above, the light on each plant is also inherently intermittent. This is important as to the plants, i.e., it is required that the light be intermittent to achieve optimum growth characteristics.

In summary, the invention provides a highly improved method and apparatus of the character described. The invention makes possible the use of the most efficient light source currently available as to the plants for the prevention of dormancy. The invention uses a light source which operates continuously, but in such a way that each plant is lit intermittently, as is required by its biology and the desires of the grower. The invention provides an apparatus which is relatively much less expensive to build, install and operate than prior art such devices, because the invention provides a single fixture, which replaces, in many cases, literally dozens of incandescent or fluorescent lamps provided in fixed arrays. Finally, the invention avoids all problems in the maintenance area which are present whenever lights have to move through greenhouses, because the light used in the present invention is fixed and stationary, and thus relatively easy to insulate, reliably and for the long term, from the harsh (electrically) greenhouse environment.

The invention will be best understood from a study of the following detailed description and claims, reference being had to the accompanying drawing also forming a part of this disclosure.

DETAILED DESCRIPTION OF THE PREFERRED EMBODIMENTS

Figure 1:
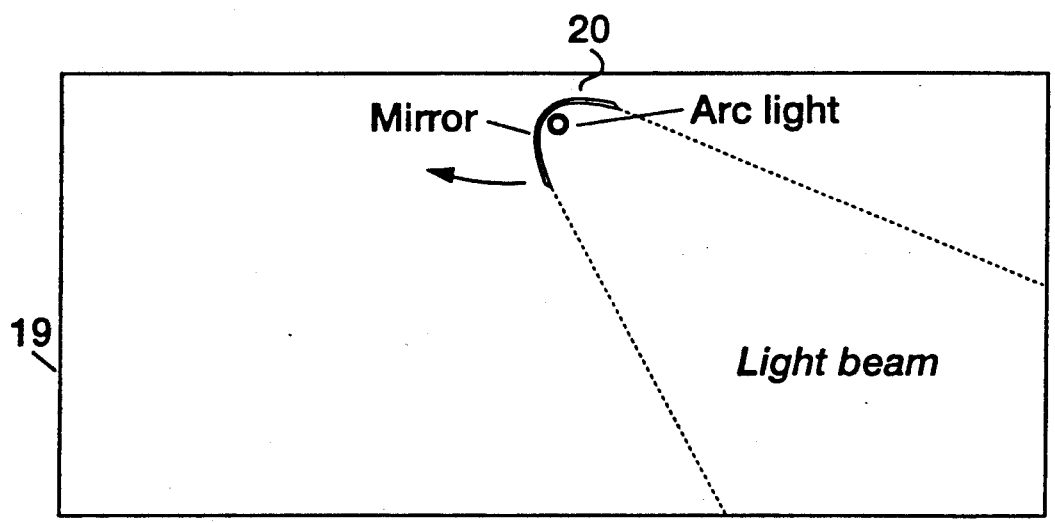
FIGS. 1, 2, and 3 are schematic diagrams illustrating the overall method of operation of the invention.
Figure 2:
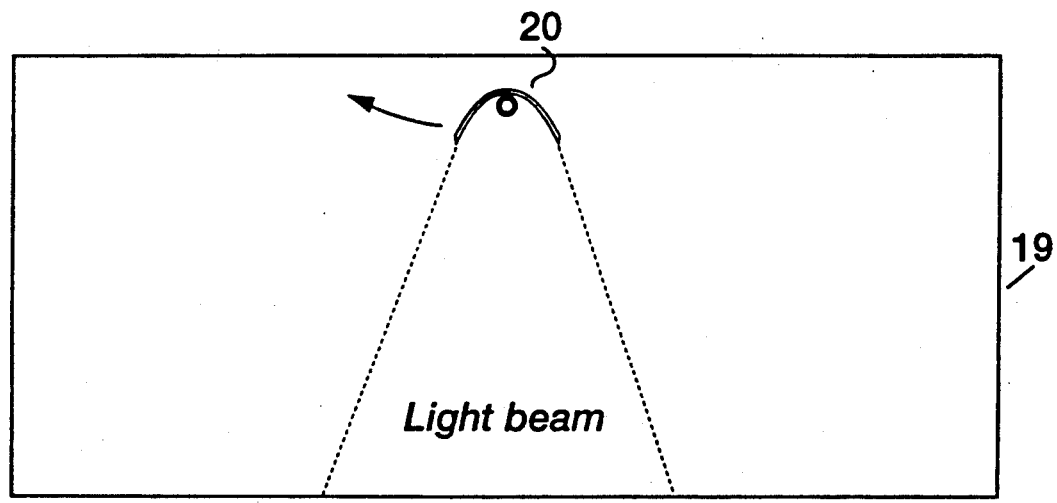
Figure 3:
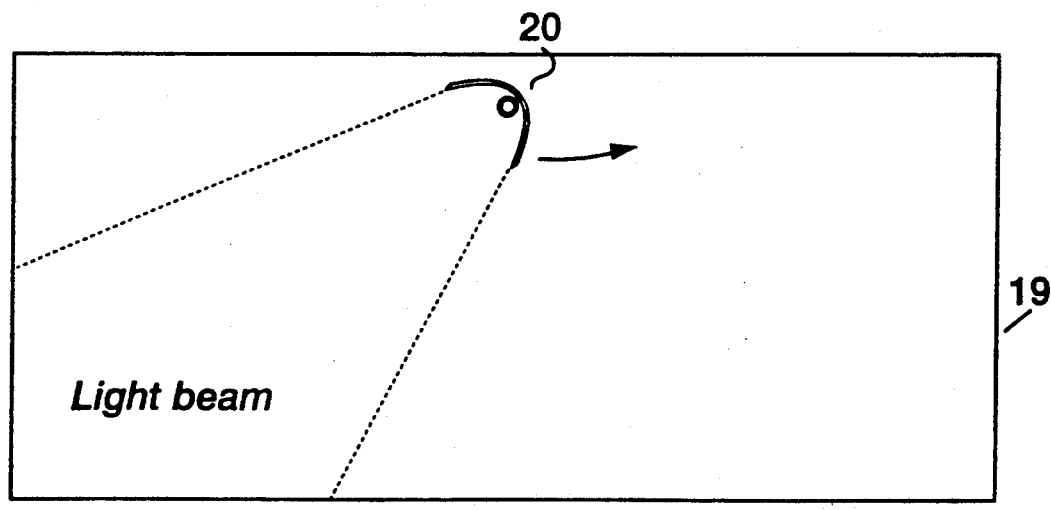

FIGS. 1, 2 and 3 show a greenhouse 19 in which a light fixture 20 embodying the invention is centrally mounted. These three FIGS. show the manner in which the beam from the light fixture 20 is swept or "flicked" from end to end across the greenhouse to intermittently illuminate all of the plants growing in the greenhouse 19. Not shown in FIGS. 1, 2 and 3 is the fact that the mirror is so designed that the lamp will cover the full width (into the paper) of the greenhouse 19 on each sweep of the light beam from end to end.

Figure 4:
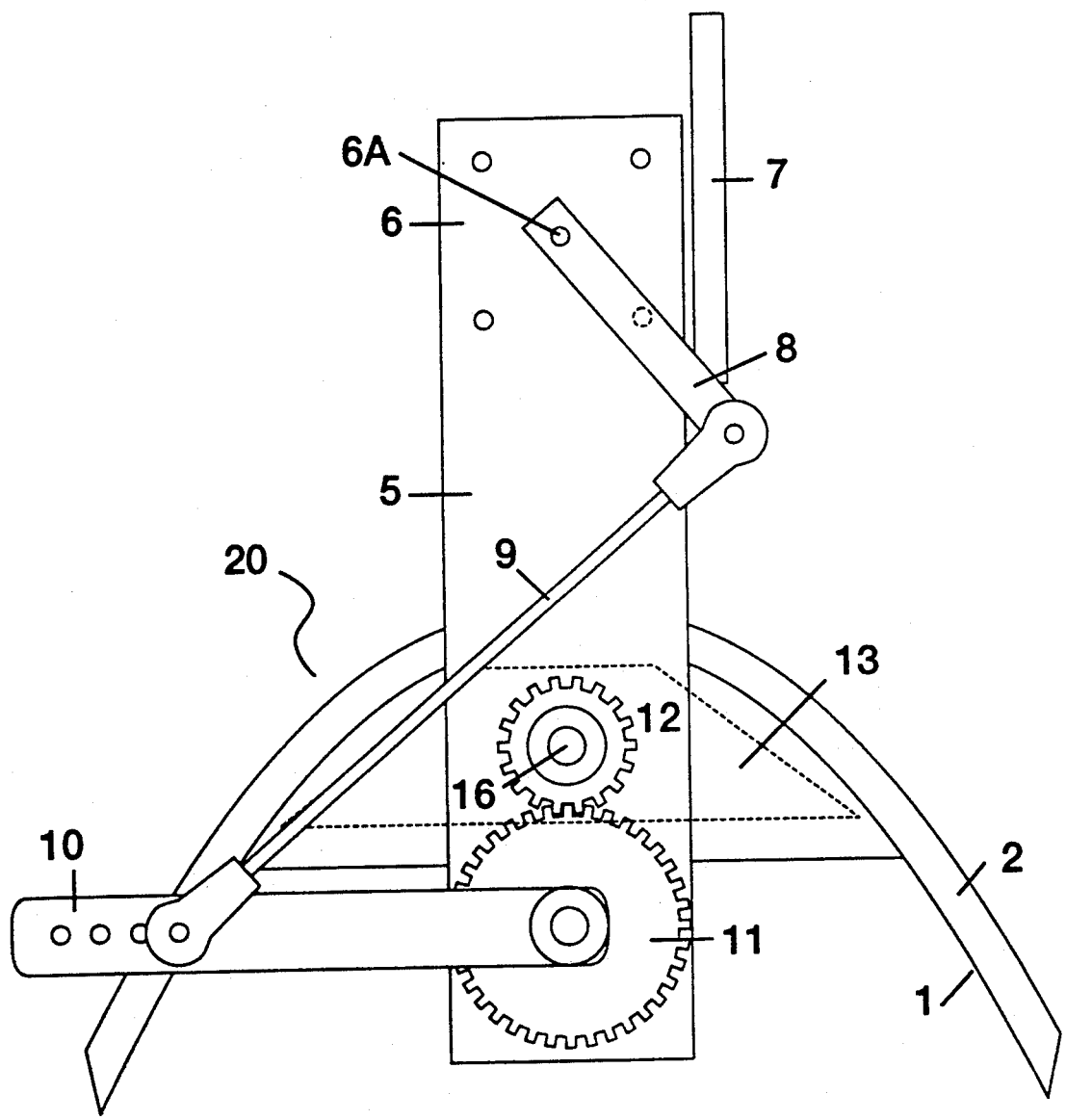
FIG. 4 is a side elevational view of a light fixture embodying the invention.
Figure 5:
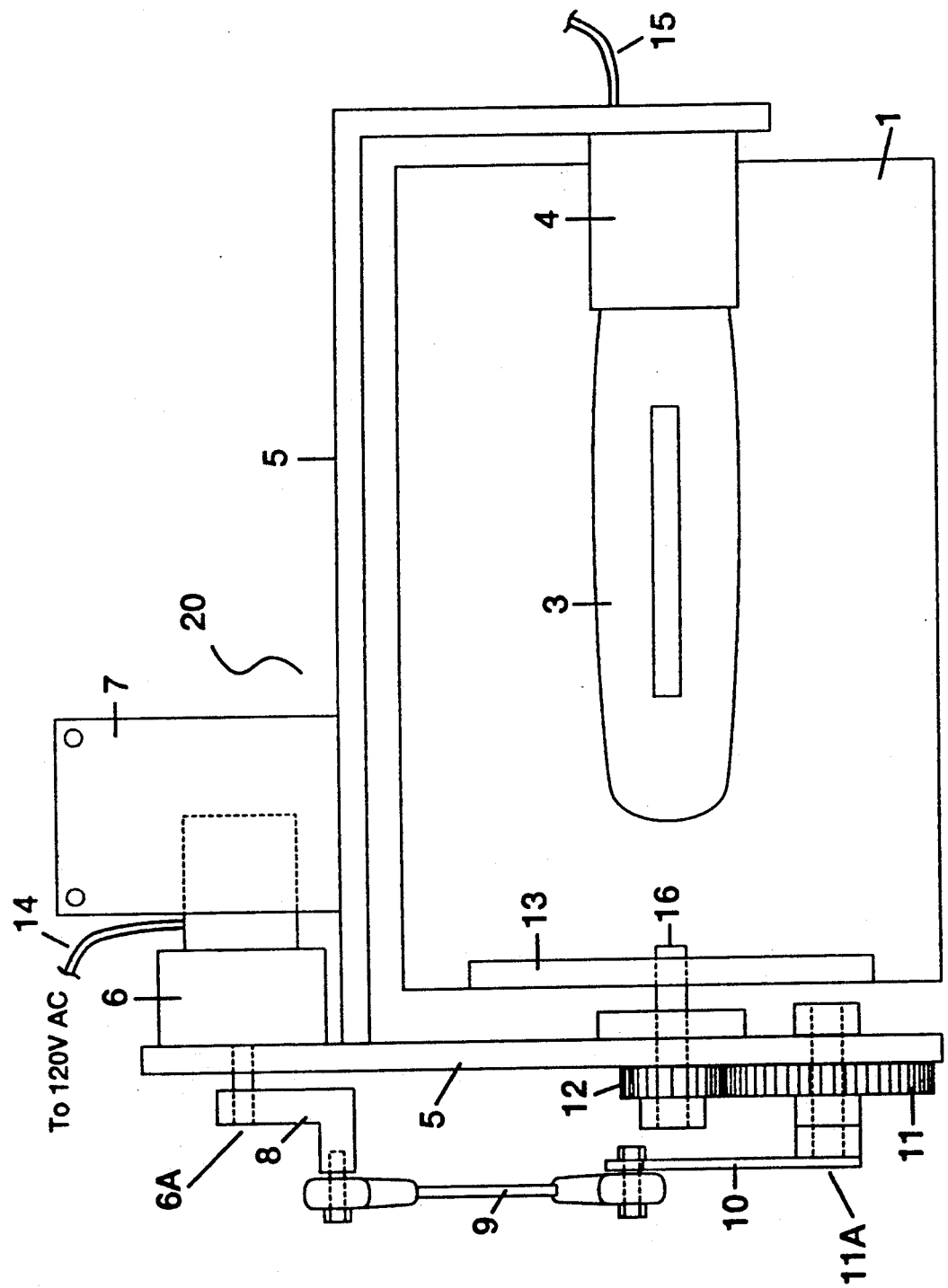
FIG. 5 is a front elevational view thereof.
Figure 8:
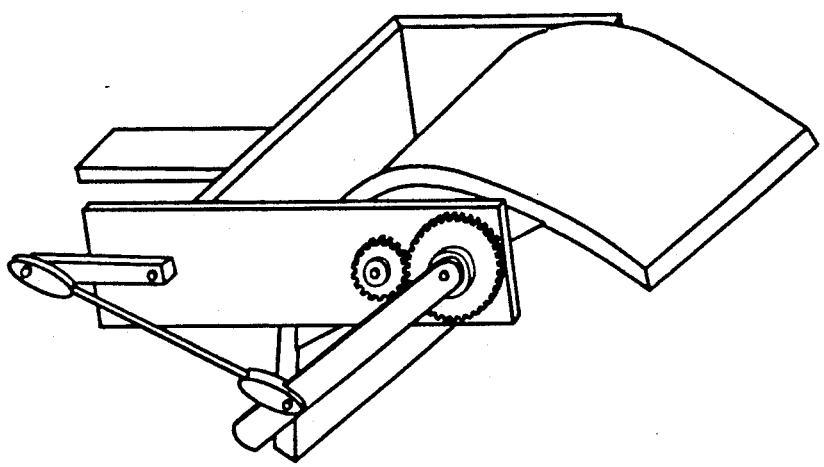
FIGS. 6, 7 and 8 are perspective views showing the manner of motion of the invention.
Figure 7:
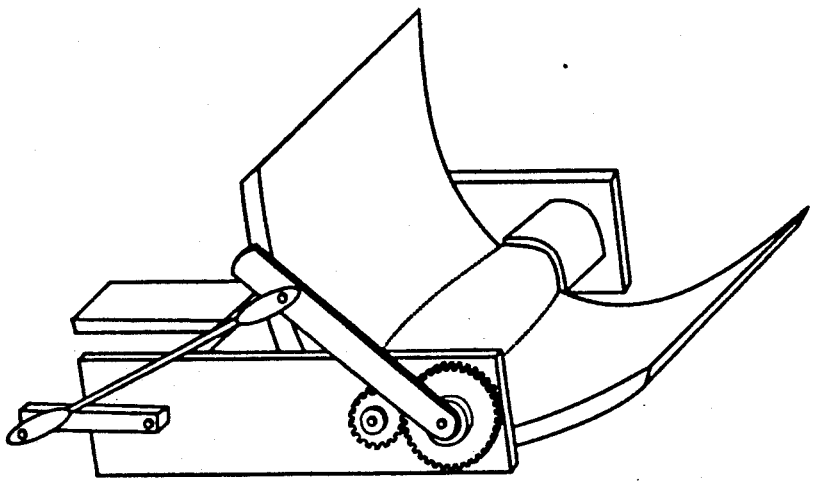
Figure 6:
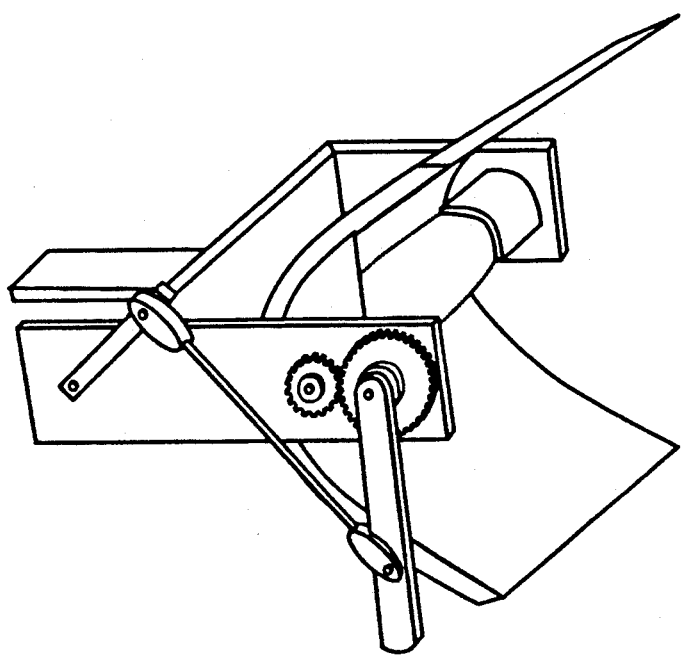

Referring now to FIGS. 4 and 5, the light fixture 20 of the invention is shown in detail. The lamp 3 is mounted in a socket 4 which is fixed to a frame 5. Wires 15 deliver power to the lamp 3 through control circuitry shown in FIGS. 9 and 10 and described further below.

The fixture 20 is mounted in the greenhouse 19 centrally thereof, and with its axis 3 arranged at right angles to the long axis of the greenhouse. This is indicated schematically in FIGS. 1-3, and 9 in that lamp 3 is shown end on. Also, the fixture 20 is mounted as high as is practical in the greenhouse, and certainly above the height of normal people.

A parabolic mirror 1 is mounted to end braces 2 and mirror end brace 13. The mirror assembly of the parts 1, 2 and 13 is mounted on a mirror oscillating shaft 16 which is aligned with the axis of the bulb 3, and both of which (the bulb 3 and the shaft 16) are coincident with the focal line or plane of the parabolic mirror 1. In this manner, as the mirror 1 rotates about the axis defined by the shaft 16 and the bulb 3, the bulb 3 is always located at this focal plane even though the bulb itself is stationary. A mirror or brace 13 is used to attach the mirror to shaft 16.

The size of the mirror is determined by the diameter of the bulb and the need for some clearance, because of the heat produced by the bulb, between the bulb 3 and the mirror 1. The length of the mirror 1, as indicated in FIG. 5, is longer than the bulb in order to collect all the light from the bulb, and in order to reach fully from side to side of the greenhouse.

Means are provided to oscillate the mirror 1 about its own focal line around the bulb 3. To this end, a gear motor 6 having a shaft 6A is mounted on a bracket portion 7 of the frame 5. The bracket is located, from side to side as seen in FIG. 5, in an appropriate location so as to balance the entire weight of the fixture 20 to facilitate its handling and mounting.

The shaft 6A fits through another portion of the bracket 5, and is fixed to one end of a crankshaft 8. A connecting rod 9 joins the other end of the crankshaft 8 to a selected location, which is chosen by picking from a choice of several holes in the large gear arm 10 a length appropriate to the size of greenhouse, size of bulb, and other parameters considered in making this selection which will vary amount and intensity of the illumination available in the greenhouse, on a large gear arm 10 associated with the large gear 11. Gear 11 is journaled to bracket 5 on its shaft 11A. The large gear 11 meshes with the small gear 12 which is mounted on shaft 16 described above.

Figure 9:
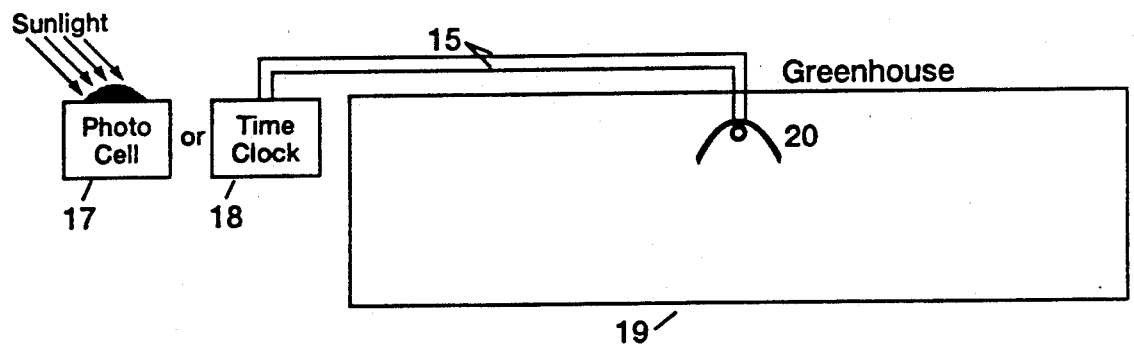
FIG. 9 is an electrical schematic diagram showing the controls.
Figure 10:
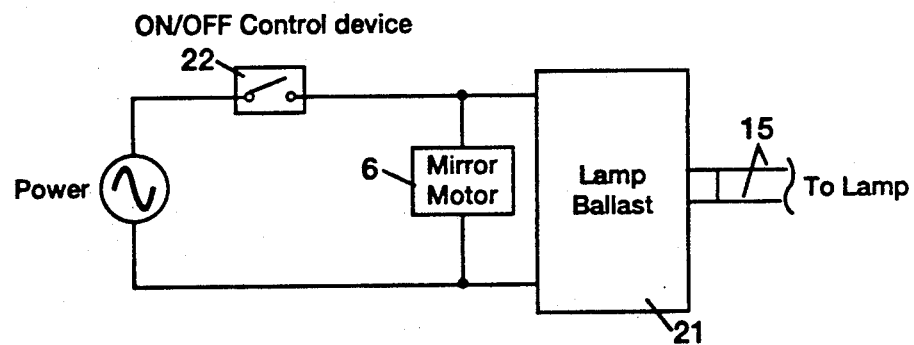
FIG. 10 is a more detailed electrical schematic diagram.

Wires 14 deliver power to gear motor 6, and this arrangement can be wired together with the remainder of the circuitry shown in FIGS. 9 and 10, although that is not shown since it is well known to those skilled in these arts.

The parts 8, 9, 10, 11 and 12 are selected so that as the gear motor 6 rotates, the mirror 1 is oscillated in arcs of up to 180°, or less, as required. In the successfully constructed embodiment, the teeth on the gears 11 and 12 are in the ratio of 2:1. The lengths of the arms are selected such that as the gear motor rotates, the large gear 11 oscillates through some angle but up to 90°. This oscillation can be made less if the connecting rod 9 is adjusted along the holes of the outer end of the arm 10, which, of course, is the function of these holes in the arm 10. The large gear 11 then drives the small gear 12 through an angle equal to twice the angle of the rotation of the large gear 11. This in turn causes the mirror 1 to oscillate correspondingly to the motion of the small gear 12 and its shaft 16. In this manner, a selectable angle of rotation of up to 180° with no unnecessary strain on the connecting linkage is provided in accordance with the invention.

As to the lamp 3, high pressure sodium arc bulbs are commercially available in various sizes. In the successfully constructed embodiment, a greenhouse measuring 20 feet by 50 feet was used. It was found that a bulb of 400 watts was more than sufficient to achieve good results. If a larger greenhouse were utilized, that application might require a 1,000 watt sodium arc light. In smaller greenhouses, smaller size bulbs of 150 or 250 watts could be used.

The mirror 1 was made of polished stainless steel. In developing the invention, a silvered plexiglass was used first, but it melted. The bulb 3 produces a great deal of heat. It is feared that a glass mirror would not be satisfactory either, because as water often drips in greenhouses, cool water falling on a hot glass mirror could cause it to shatter. An aluminum mirror is thought not to be operative either because its reflectiveness would be subject to corrosion due to the rigorous conditions in a greenhouse. Further, aluminum might scratch more easily. The mirror could possibly be made of other materials. The criteria are that it must dissipate a substantial amount of heat without warping or loss of reflectiveness.

As to gear motor 6, very little actual power is needed. It is thought that any output between 2 and 60 revolutions per hour would be acceptable. In the successfully constructed embodiment, a 1 RPM motor was used with complete success. Further, a 1 RPM motor is a standard off-the-shelf item, thus further reducing the cost of building this embodiment of the invention. A speed of at least 2 revolutions per hour is thought to be the minimum because a dark period of longer than 30 minutes is deemed to be undesirable from the viewpoint of the biology of most plants. As is clear, each revolution of motor 6 corresponds to one complete cycle of oscillation of the mirror 1, see FIG. 4.

The exact length of the arms 8, 9 and 10 is selected in order to achieve the desirable method of operation, as set forth above. If the angle of oscillation is greater than 90°, it is feared that excess stress on the linkage would cause the arms to bend or to jam.

A 2:1 step-up gear ratio was used in the successfully constructed embodiment. However, other ratios, perhaps in the range of 1.5 to 3 would be acceptable.

Finally, stock aluminum shapes were used to produce the frame 5. Aluminum is light, strong, and easily machined. However, other materials could also be used.

The drawings illustrate the successfully constructed prototype of the invention which has been built and is in successful use. When the invention is produced commercially, it is anticipated that many improvements and changes within the teaching of the invention and the scope of the following claims will be made. For example, the linkage 8, 9 and 10 could be simplified and less expensive parts used. The gears could be encased. Likewise, the gear motor could be encased. Other changes will present themselves to those skilled in the various manufacturing arts.

FIGS. 9 and 10 show the means to control the light fixture 20. As shown in FIG. 9, the light fixture 20 alone is mounted inside the greenhouse 19. The controls, which may comprise a timeclock 18 or a photocell 17, are mounted externally of the greenhouse. They may be in any sort of enclosure, another building, or a shed or the like, as might be convenient in a particular embodiment and application of the invention.

FIG. 10 illustrates that there are several ways of controlling the operation of the lamp and mirror. All such means are indicated by block 22 in FIG. 10. These means include that:

A. The block 22 could represent the normally closed photocell 17 of FIG. 9. The lamp and oscillator motor remain off in the daytime. The switch closes at dusk, and the lamp and mirror operate all night. The switch opens at daybreak. Operation is completely automatic.

B. The block 22 could represent the 24 hour timeclock 18 of FIG. 9. Contacts are normally set to close at dusk and open at dawn, but can be set to operate less than the full night, if light is not needed for the entire night. Timeclocks need to be reset periodically as the seasons change.

C. The block 22 could represent a manual switch. If labor is available at the appropriate times of day to turn it on and off, a manual switch is the cheapest and simplest device to use.

While the invention has been described in some detail above, it is to be understood that this detailed description is by way of example only, and the protection granted is to be limited only within the spirit of the invention and the scope of the following claims.

NUMBER SHEET FOR GREENHOUSE ILLUMINATION SYSTEM 1. mirror
2. mirror brace
3. lamp
4. lamp socket
5. frame
6. gearmotor
6A. shaft
7. bracket
8. crankshaft
9. connecting rod
10. large gear arm
11. large gear
11A. shaft
12. small gear
13. mirror end brace
14. gearmotor wires
15. lamp wires
16. mirror oscillating shaft
17. photocell
18. timer
19. greenhouse
20. fixture overall
21. lamp ballast

I claim:

1. A method of providing light intermittently to plants growing in a greenhouse comprising the steps of:
   selecting a light bulb having a predetermined output spectrum;
   providing a single light fixture;
   mounting said bulb in said light fixture so that said bulb does not move in use;
   providing a heat resistant parabolic mirror in said fixture;
   locating said bulb at the focal line of said mirror;
   mounting said fixture centrally in said greenhouse;
   causing said mirror to oscillate about its focal line through a predetermined angle; and
   selecting said angle such that the light from said bulb is swept over substantially all of the plants in said greenhouse.

2. The method of claim 1, selecting a high pressure sodium arc light as said light bulb.

3. The method of claim 1, and oscillating said mirror at a speed in the range of at least two to about 60 complete cycles of oscillation per hour.

4. The method of claim 1, and selecting the wattage of said light bulb in accordance with the size of said greenhouse.

5. The method of claim 1, wherein said greenhouse has dimensions on the order of 20 feet wide by 50 feet long, mounting said fixture in said greenhouse above normal head level of people walking and working in said greenhouse, and said light bulb comprises an elongated high-pressure sodium arc lamp of 400 watts power.

6. The method of claim 1, wherein selecting said predetermined angle of mirror oscillation to be relatively close to but less than about 180°.

7. The method of claim 1, providing control means and lamp ballast means for said light fixture, and mounting said control means and said ballast means externally of said greenhouse.

8. A light fixture for providing light intermittently to plants growing in a greenhouse, comprising frame means, a light bulb of a predetermined light output spectrum, parabolic mirror means, means to mount said mirror means on said frame, means to cause oscillating motion of said mirror means with respect to said frame means about the focal line of said mirror means, and means to mount said light bulb on said frame means at the focal line of said mirror means, and so that said light bulb does not move with respect to said mirror means.

9. The fixture of claim 8, said mirror means consisting essentially of polished stainless steel.

10. The fixture of claim 8, wherein said greenhouse has dimensions on the order of 20 feet wide by 50 feet long, means to mount said fixture in said greenhouse above normal head level of people walking and working in said greenhouse and centrally of said greenhouse, and said light bulb comprising an elongated high-pressure sodium arc lamp of 400 watts power.

11. The fixture of claim 8, said means to cause oscillatory motion comprising a gear motor, means to mount said gear motor on said frame, linkage means interconnecting said gear motor with said mirror means, and the speed of said gear motor together with the dimensions and configuration of said linkage causing said mirror means to oscillate at a speed in the range of at least 2 to about 60 complete cycles of oscillation per hour.

12. The fixture of claim 11, said linkage means including means to control the total arc of swing of said mirror means about its focal line.

13. The fixture of claim 11, said linkage including speed change gear means, said linkage including a crankshaft driven by said gear motor and means connecting the output of said crankshaft to the input of said speed change gear means, and said linkage being such that the speed of oscillation of said mirror means matches the speed of rotation of said gear motor.

14. The fixture of claim 8, means to mount said light fixture in a greenhouse centrally therein, control means and lamp ballast means for said light fixture, and means to mount said control means and said ballast means externally of said greenhouse.

15. The fixture of claim 14, said control means including a control circuit of said lamp ballast means, said gear motor; and a manual switch.

16. The fixture of claim 14, said control means including a control circuit of said lamp ballast means, said gear motor, and a 24 hour time means.

17. The fixture of claim 14, said control means including a control circuit of said lamp ballast means, said gear motor, and a normally closed photocell means.

* * * * *